US006867817B2

(12) United States Patent
Bellers

(10) Patent No.: US 6,867,817 B2
(45) Date of Patent: Mar. 15, 2005

(54) NATURAL LUMINANCE TRANSIENT ENHANCEMENT

(75) Inventor: Erwin B. Bellers, South Salem, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 482 days.

(21) Appl. No.: 10/023,131

(22) Filed: Dec. 17, 2001

(65) Prior Publication Data

US 2003/0112373 A1 Jun. 19, 2003

(51) Int. Cl.[7] .................................................. H04N 5/21
(52) U.S. Cl. ........................................ 348/625; 348/26
(58) Field of Search ................................ 348/625, 630, 348/26, 627, 673, 674, 677; 382/266, 269, 270; H04N 5/21, 5/213

(56) References Cited

U.S. PATENT DOCUMENTS

| 4,918,528 | A | * | 4/1990 | Oohashi ..................... 348/625 |
| 5,469,225 | A | * | 11/1995 | Hong ........................ 348/625 |
| 6,005,983 | A | | 12/1999 | Anderson et al. .......... 382/254 |
| 6,097,848 | A | | 8/2000 | Salvati ....................... 382/266 |
| 6,181,385 | B1 | * | 1/2001 | Correa ...................... 348/625 |
| 6,618,097 | B1 | * | 9/2003 | Yamada ..................... 348/625 |
| 6,677,994 | B1 | * | 1/2004 | Kobayashi ................. 348/625 |

FOREIGN PATENT DOCUMENTS

| EP | 0740465 A2 | 4/1996 | ............ H04N/5/21 |
| WO | WO9712482 | 9/1996 | .......... H04N/5/208 |

OTHER PUBLICATIONS

Patent Abstracts of Japan, "Waveform Edge Steepening Device", 07–129533, Apr. 28, 1995, Victor Co of Japan Ltd.
Patent Abstracts of Japan; vol. 1999, No. 05, May 31, 1999, JP 11055546A.
Patent Abstracts of Japan, vol. 017, No. 301, (E–1378), Jun. 10, 1993, JP05022633A.

* cited by examiner

Primary Examiner—Sherrie Hsia
(74) Attorney, Agent, or Firm—Edward W. Goodman

(57) ABSTRACT

A method and apparatus for enhancing an edge transient contained in a video signal include identifying the edge transient and the edge center of the edge transient in the video signal; selecting a side of the edge transient, relative to an edge center thereof, to enhance; and adding an edge change signal to the video signal to asymmetrically enhance the selected edge transient.

16 Claims, 2 Drawing Sheets

NATURAL LUMINANCE TRANSIENT ENHANCEMENT

FIELD OF THE INVENTION

This invention relates to video signal processing, and more particularly, to a method and apparatus for enhancing edge transients contained in a video signal to improve displayed video image sharpness by asymmetrically steepening the edge transients.

BACKGROUND OF THE INVENTION

Improvements in the perceived sharpness of a displayed video image produced from a video signal, are typically accomplished with edge transient sharpness enhancement methods that employ an enhancement signal which is added to the video signal to steepen edge transients contained therein. Utilizing such an enhancement signal steepens the rise in a transition from a dark image region to a light image region, or alternatively, steepens the fall in a transition from a light image region to a dark image region.

Some prior art edge transient sharpness enhancement methods employ linear techniques which enhance frequencies that are already within the video image by using a linear high frequency boosting filter. Other prior art edge transient sharpness enhancement methods employ highly non-linear techniques that attempt to steepen the edge transients without introducing so-called under and overshoots which are introduced by the linear techniques. As such, truly new high frequencies are introduced into the displayed video image.

The linear techniques are used in some prior art edge transient sharpness enhancement methods to symmetrically modify video signal edge transients on both sides of the edge transient center by steepening both sides of the edge transient substantially equally. Other prior art edge transient sharpness enhancement methods use the non-linear technique to steepen the sides of the edge transient, but all in a symmetrical manner.

FIG. 1 is an enhanced edge transient generated by an exemplary prior art edge transient enhancement method that localizes the edge center of the edge transient of a video signal and steepens the edge transient on both sides of the edge center symmetrically. Solid line 10 represents an edge transient of a video signal having an edge center 12, a first edge side portion 14 and a second edge side portion 16. Solid line 18 represents an edge enhancement signal or edge change signal. The edge change signal 18 is generally symmetrical around its zero crossing, the position of which is located at the edge center 12 of the edge transient 10. The edge change signal 18 is added to the original video signal 10 to arrive at a video signal with an enhanced edge transient represented by dashed line 20. The enhanced edge transient 20 includes an edge center 22 which is substantially identical to edge center 12 of the original edge transient video signal 10, a first enhanced or steepened edge side portion 24 and a second enhanced or steepened edge side portion 26.

There are problems associated with these prior art edge transient enhancement methods. Thin (white) lines in the displayed video image appear wider than the same lines in the original video image, and if the enhancement is performed robustly, the resulting video image may appear very unnatural.

Accordingly, improvements in edge transient enhancement is needed to overcome the problems associated with prior art edge transient enhancement methods.

SUMMARY OF THE INVENTION

A method and apparatus is disclosed herein for enhancing an edge transient contained in a video signal. The method comprises identifying the edge transient in the video signal, and asymmetrically enhancing the edge transient of the video signal. The apparatus comprises means for identifying the edge transient in the video signal, and means for asymmetrically enhancing the edge transient of the video signal.

BRIEF DESCRIPTION OF THE DRAWINGS

The advantages, nature, and various additional features of the invention will appear more fully upon consideration of the illustrative embodiments now to be described in detail in connection with accompanying drawings where like numerals are used to identify like elements and wherein.

It should be understood that the drawings are for purposes of illustrating the concepts of the invention and are not necessarily to scale.

DETAILED DESCRIPTION OF THE INVENTION

Figure 2:
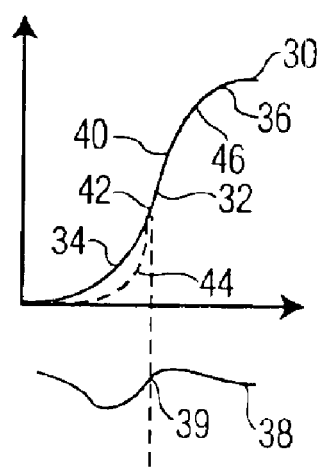
FIG. 2 graphically depicts an enhanced edge transient generated by the method of the present invention.

The present invention achieves improved displayed video image sharpness by asymmetrically steepening edge transients contained in a video signal. FIG. 2 graphically depicts an enhanced edge transient generated by the method of the present invention. Solid line 30 represents an edge transient of a video signal having an edge center 32, a first edge side portion 34, which is the darker portion of the transient 30, and a second edge side portion 36, which is the brighter portion of the transient 30. Solid line 38 represents an edge enhancement signal or edge change signal. In accordance with the present invention, the edge change signal 38 includes a zero crossing 39 which is located at the edge center 32 of the edge transient 30. The edge change signal 38 is generally asymmetrical around the zero crossing 39.

The edge change signal 38 is added to the video signal to asymmetrically enhance the edge transient 30 of that signal, i.e., to arrive at a video signal with an asymmetrically enhanced edge transient represented by dashed line 40. The enhanced edge transient 40 includes an edge center 42 which is located at the edge center 32 of the edge transient 30. The enhanced edge transient 40 further includes an enhanced or steepened first edge side portion 44, i.e., the darker portion of the edge transient, and a second edge side portion 46, i.e., the brighter portion of the edge transient, which is not changed, or is steepened significantly less than the first edge side portion 44. As a result, thin (white) lines are preserved in the displayed video image thereby resulting in a much more natural image. Additionally, small errors in the enhancement are generally less visible in the darker portion 44 of the edge transient 40 than in the brighter portion 46. Accordingly, robustness is improved.

Although, in most applications it is more advantageous to limit the amount of steepening applied to the brighter side of the edge transient, the invention is not limited to this embodiment. For example, there may be applications where it is advantageous to steepen the brighter side of the edge transient and limit the amount of steepening applied to the darker side of the edge transient.

The result of the introduced asymmetry is a more natural looking edge enhancement when the video image is displayed on a CRT. Any CRT inherently follows a gamma curve that relates the input luminance level to the perceived intensity level. As the gamma is larger than 1 (one), a change in the brighter side portion of the edge transient will cause a larger perceived change in intensity levels compared to the same luminance level change for the darker side portion of the edge transient. The asymmetrical edge enhancement method of the present invention at least partially compensates for this in the luminance domain.

Figure 3:
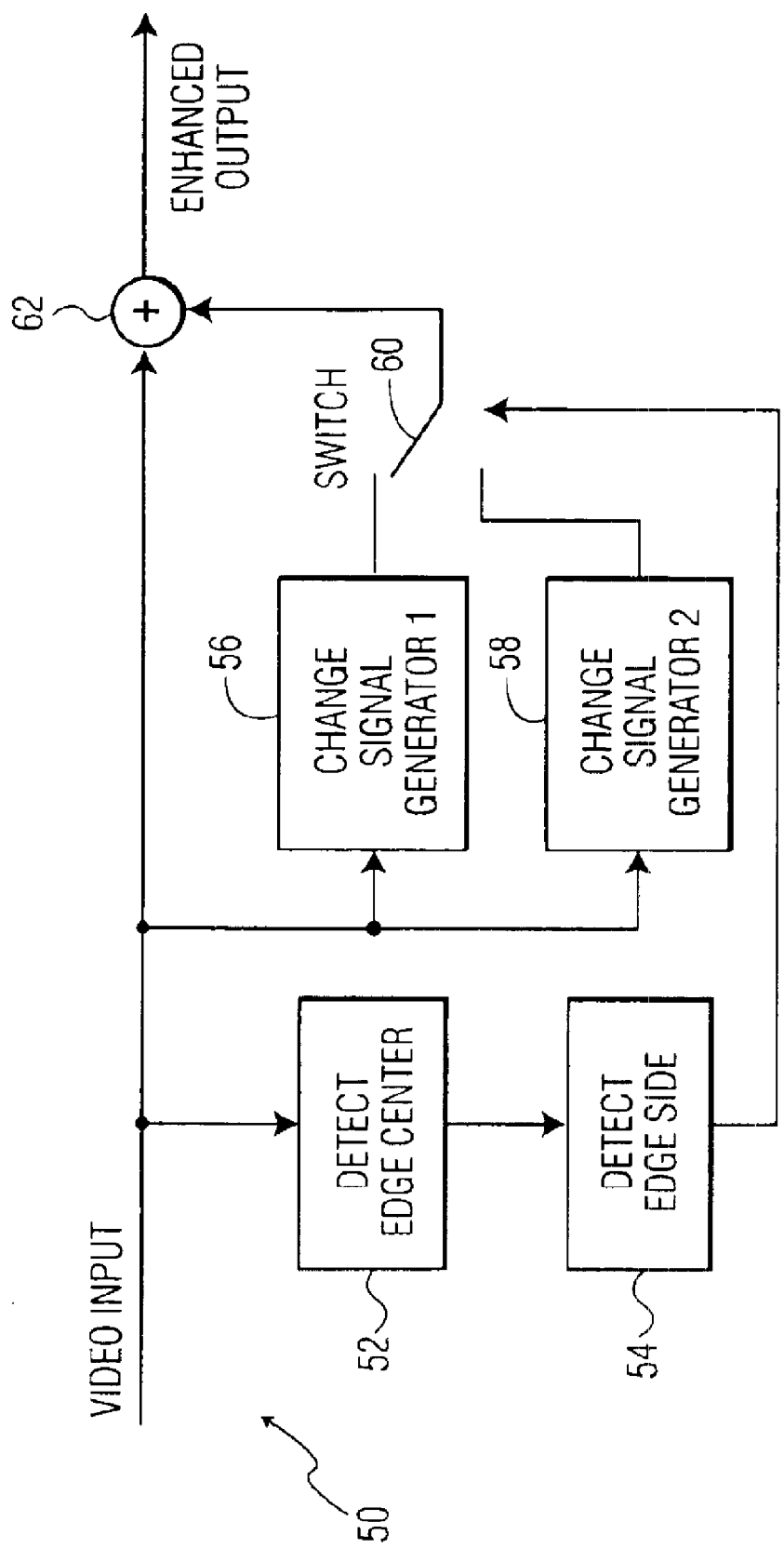
FIG. 3 is a block diagram of an edge enhancement apparatus according to an exemplary embodiment of the invention.

FIG. 3 is a block diagram of an edge enhancement apparatus 50, according to an exemplary embodiment of the invention, that asymmetrically steepens edge transients in video signals. In general, the apparatus 50 can be implemented in software, hardware, or a combination of both. The apparatus 50 comprises an edge center detector 52, an edge side detector 54, a first change signal generator 56, a second change signal generator 58, a switch 60, and an adder 62. The first change signal generator 56 generates an asymmetrical edge change signal that steepens the darker portion of an edge transient. The second change signal generator 58 generates an asymmetrical edge change signal that steepens the brighter portion of an edge transient. The change signal generators 56, 58 may be implemented using conventional linear techniques. By way of example and not limitation, the change signal generators 56, 58 may be implemented using linear highpass or bandpass filters. In another example, the change signal generators 56, 58 may be implemented using a non-linear luminance transient improvement (LTI) algorithm.

In operation, the edge center detector 52 detects the spatial location of an edge transient contained in an inputted video signal and the edge transient's center position, and outputs this data to the edge side detector 54. The edge side detector 54 determines on which side of the edge transient center the current pixel is, i.e., the darker (lower) or brighter (higher) portion of the edge transient, and outputs this information to the switch 60. The output of the edge side detector 54 is a binary signal that is used to select between the output of the first and second change signal generators 56, 58. The output of one of the first and second change signal generators 56, 58 is selected by the switch 60 in accordance with signal outputted by the edge side detector 54 (which includes an identification of what side of the edge center the current pixel was located), and added to the original video signal via the adder 62 to asymmetrically enhance the edge transient of the original video signal thereby arriving at a video signal with an asymmetrically enhanced edge transient.

Figure 1:
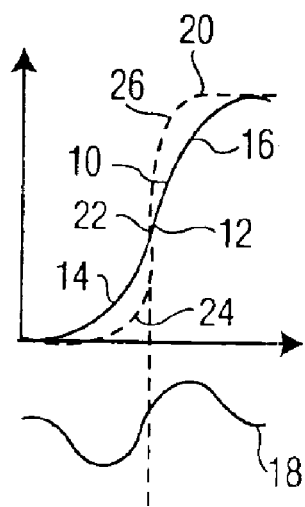
FIG. 1 graphically depicts an enhanced edge transient generated by a prior art edge transient enhancement method.

While the foregoing invention has been described with reference to the above embodiments, various modifications and changes can be made without departing from the spirit of the invention. For example, other methods can be used for asymmetrically steepening edge transients contained in a video signal. One method may involve shifting a linear change signal (such as the edge change signal 18 shown in FIG. 1) somewhat towards the edge peak of the video signal, i.e., out of the center. As such, the edge center changes also, and the edge has been asymmetrically steepened with respect to the input edge transient signal. This and all other such modifications and changes are considered to be within the scope of the appended claims.

What is claimed is:

1. A method of enhancing an edge transient contained in a video signal, the edge transient including first and second edge side portions, the method comprising:
   identifying the edge transient in the video signal;
   asymmetrically enhancing the edge transient of the video signal so that only one of the first and second edge side portions is substantially enhanced.

2. The method according to claim 1, wherein the identifying step includes detecting an edge center of the edge transient.

3. The method according to claim 1, wherein the identifying step includes selecting one of the first and second edge side portions of the edge transient, relative to an edge center thereof, to substantially enhance.

4. The method according to claim 1, wherein the asymmetrically enhancing step includes adding an edge change signal to the video signal.

5. The method according to claim 1, wherein the identifying step includes:
   detecting an edge center of the edge transient; and
   selecting one of the first and second edge side portions of the edge transient, relative to the edge center thereof, to substantially enhance.

6. An apparatus for enhancing an edge transient contained in a video signal, the edge transient including first and second edge side portions, the apparatus comprising:
   means for identifying the edge transient in the video signal;
   means for asymmetrically enhancing the edge transient of the video signal so that only one of the first and second edge side portions is substantially enhanced.

7. The apparatus according to claim 6, wherein the identifying means includes means for detecting an edge center of the edge transient.

8. The apparatus according to claim 6, wherein the identifying means includes means for selecting one of the first and second side edge portions of the edge transient, relative to an edge center thereof, to substantially enhance.

9. The apparatus according to claim 6, wherein the asymmetrically enhancing means includes means for adding an edge change signal to the video signal.

10. The apparatus according to claim 6, wherein the identifying means includes:
    means for detecting an edge center of the edge transient; and
    means for selecting one of the first and second side edge portions of the edge transient, relative to the edge center thereof, to substantially enhance.

11. A video signal having an enhanced edge transient produced by the steps comprising:
    identifying the edge transient in the video signal;
    asymmetrically enhancing the edge transient of the video signal so that only one of first and second edge side portions of the edge transient is substantially enhanced.

12. The video signal according to claim 11, wherein the identifying step includes detecting an edge center of the edge transient.

13. The video signal according to claim 11, wherein the identifying step includes selecting one of the first and second side edge portions of the edge transient, relative to an edge center thereof, to substantially enhance.

14. The video signal according to claim 11, wherein the asymmetrically enhancing step includes adding an edge change signal to the video signal.

15. The video signal according to claim 11, wherein the identifying step includes detecting an edge center of the edge transient; and
    selecting one of the first and second side edge portions of the edge transient, relative to the edge center thereof, to substantially enhance.

16. A video signal comprising:
    an edge transient;
    an edge center defined by the edge transient;
    a first edge side portion defined by the edge transient; and
    a second edge side portion defined by the edge transient;
    wherein one of the first and second edge side portions is steepened and the other one of the first and second side edge portions is not steepened.

* * * * *